Patented May 16, 1944

2,349,223

UNITED STATES PATENT OFFICE 2,349,223

TREATMENT OF GARNIERITE ORES

Norman Hedley and John Joseph Kress, Stamford, Conn., assignors to American Cyanamid Company, New York, N. Y., a corporation of Maine No Drawing. Application May 20, 1942,
Serial No. 443,691

6 Claims. (Cl. 75—119)

This invention relates to a process of recovering nickel from garnierite ores.

Garnierite nickel ores present a very serious problem in ore dressing because in many cases the nickel is chemically united with the gangue as well as present in the form of nickel silicate so that with many ores a procedure which involves a physical separation such as froth flotation, gravity concentration and the like is inapplicable because a large portion of the nickel would be rejected with the gangue. It is also usually not feasible to smelt such ores directly, particularly in the case of low grade ores because of excessive temperatures, fuel requirements, and fluxes and also because the ores frequently contain other metals such as copper, iron and cobalt.

It has been proposed to leach garnierite ores with the usual solvents such as acids or alkalies. This is only a partial solution to the problem because unfortunately in many garnierite ores only part of the nickel is soluble or in such a form that can be dissolved and therefore losses in a leaching procedure become so high as to render the process uneconomic.

The present invention permits a high recovery of nickel from garnierite ores and also a good separation from copper and iron. The process involves a number of steps, most of which are not unknown in ore dressing as manipulative steps. The combination, however, is one which has never been used with any nickel ore and it solves the serious problem presented by these ores in an economical manner.

Essentially the present invention involves first a reduction of the ore by roasting to reduce the nickel silicate. The roasted ore is then leached with an $SO_2$ solution and the nickel is preferably precipitated in two products, first by the removal of $SO_2$ and in a second product by the regulated addition of sodium sulfide. The sulfide precipitates may then be calcined to produce concentrates having high nickel content, for example in the case of the second precipitate 60 to 70% of nickel, and the overall recovery is excellent, amounting under favorable conditions to more than 90% of the nickel originally in the ore.

It is an advantage of the present procedure that no radically new technique is employed nor is special equipment necessary other than that which is commonly used in ore dressing. Thus the reducing roast may be effected in any of the well known furnaces and will ordinarily require from 5 to 10% of the reducing agent such as coke, powdered coal, or charcoal. The temperature may advantageously be from 800 to 1000° C., but is not critical. The roast should normally be continued until substantially all of the nickel silicate has been reduced. Standard roasting techniques are employed.

It is normally preferable to grind the ore before roasting as otherwise some of the nickel in coarser sizes may not be fully reduced and sometimes the leaching is incomplete. With some ores the roasting step may be effected without grinding and the leach residue ground and releached ore, if necessary, added to a fresh batch in the roaster.

The leaching of the roasted ore is effected in apparatus of the known type using an $SO_2$ solution with a dilution ratio of about 3:1. It is frequently desirable, particularly with low grade ores, to effect the leaching in two steps. Thus for example the first leach may be for about 24 hours which will extract the major portion of the soluble nickel, e. g. more than 80% and then the slurry may be filtered or leach liquor and solids separated by settling and the solid residue subjected to a second leaching operation with fresh $SO_2$ solution, recovering an additional 5 or 6% of nickel.

In addition to nickel the leach solution may contain other soluble constituents such as copper, cobalt, and iron. The metals exist in a mixture possibly as sulfites, thiosulfates or complex thionates, and the solution of course contains excess sulfur dioxide. This excess sulfur dioxide is preferably removed by boiling and after removal copper, if present, is precipitated as cuprous sulfide. A product analyzing 50 to 60% of copper and about 10% of nickel can normally be recovered by settling or filtration.

The filtrate is then treated with sodium sulfide, the addition being gradual so as to prevent precipitation of iron. By careful addition of the sodium sulfide substantially all of the remaining nickel can be precipitated without precipitating more than 15% of the iron and under favorable circumstances considerably lower percentage of iron. The precipitate is granular, and settles and filters readily. While it is desirable to boil off the excess sulfur dioxide and effect two precipitations, one of copper and one of nickel sulfide when there is considerable copper present, this is not essential, particularly when but little copper is present. However, even in such a case, if the removal of sulfur dioxide is eliminated a larger amount of sodium sulfide becomes necessary in order to neutralize the excess sulfur dioxide and cost of operation is thereby increased because the sodium sulfide used to neutralize the excess acid is largely wasted. When care is taken and the excess sulfur dioxide first removed the amount of 60% sodium sulfide required to precipitate one pound of nickel may be kept down to 2.8 to 2.9 pounds.

The nickel sulfide obtained can be calcined to give a crude nickel oxide containing from 60 to 70% nickel and the sulfur dioxide given off may, if desired, be utilized in the leaching step, thus conserving the amount of sulfur dioxide required and further reducing the cost of operation.

The invention will be described in greater detail in conjunction with a specific example which describes the treatment of a typical garnierite ore from Brazil. It should be understood that the details of operation will vary with different ores and the example is therefore intended to be illustrative only.

The ore had the following analysis:

| | Per cent |
|---|---|
| Nickel | 4.61 |
| Copper | 0.52 |
| Cobalt | 0.075 |
| Iron | 8.93 |
| Insoluble | 66.05 |
| Sulfur | Trace |

The ore was ground to —200 mesh, dried and divided into a number of portions which were treated with various amounts of coke in a reducing roast and were also subjected to various leaching procedures, with or without roasting using sulfur dioxide and sulfuric acid. The procedures and results are shown in the following table:

*Table*

| Roasting procedure | Leach solution | Per cent Ni extracted |
|---|---|---|
| None | Sat. SO$_2$ 24 hrs | 11.0 |
| Do | 25% H$_2$SO$_4$ 24 hrs | 34.9 |
| Oxidizing roast at 800° C | 25% H$_2$SO$_4$ 24 hrs | 5.2 |
| Reducing roast with 5% coke at 800° C | 25% H$_2$SO$_4$ 24 hrs | 78.0 |
| Reducing roast with 5% coke at 800° C | Sat. SO$_2$ 48 hrs | 74.2 |
| Reducing roast with 10% coke at 900° C | Sat. SO$_2$ 48 hrs | 90.8 |

It will be apparent that the ore is not readily susceptible to ordinary leaching procedures as at most some 35% of nickel can be removed in this way. Reducing roasts with only 5% of coke at low temperature give better results but best results are obtained with 10% coke at 900° C. From 4 to 4.1 pounds of sulfur as sulfur dioxide was required to produce the saturated leaching solution and the leach was effected as described above in two steps.

The leach solution from the reducing roast with 10% coke and sulfur dioxide leach had the following approximate analysis:

| | Per cent |
|---|---|
| Nickel | 0.82 |
| Copper | 0.059 |
| Iron | 0.83 |
| Excess SO$_2$ | |

The solution was boiled and digested hot for several hours which resulted in driving off the major portion of the excess sulfur dioxide, which can be recovered for use in a subsequent leaching step. A black colloidal precipitate resulted which rapidly flocculated, settled and was recovered by filtration. It analyzed 51.0% copper and 7.6% nickel and contained more than 99% of the dissolved copper originally present in the leach solution and only 1.1% of the dissolved nickel.

The filtrate contained approximately 0.94% of nickel and 0.95% iron. Sodium sulfide was added in the proportion of 2.85 pounds of 60% Na$_2$S per pound of nickel and a precipitate was obtained analyzing 67.65% nickel and 8.89% iron and representing a recovery of 99.6% of the dissolved nickel and 13.1% of the dissolved iron. The amount of sodium sulfide added represents a small excess over theoretical. The nickel sulfide-iron sulfide precipitate after removal was calcined to produce a product which was a mixture of nickel oxide and iron oxide.

When the amount of sodium sulfide used in the precipitation of nickel and iron was increased to 3.13 pounds to one pound of nickel a precipitate was obtained analyzing 61.95% nickel and 16.01% iron and representing 100% of the dissolved nickel and 24.5% of iron. It appears therefore that when the amount of sodium sulfide is increased beyond the point at which the major portion of the dissolved nickel is precipitated, additional precipitation is very slight and contamination with iron rapidly increases.

In the above example the nickel sulfide precipitate is recovered by filtration. With most ores this represents the most economical procedure. However, any other method of recovering the precipitate may be employed such as froth flotation.

Garnierite ores containing cobalt present no particular problem as the major portion of the cobalt is precipitated with the nickel and can be recovered by customary means.

We claim:

1. A method of recovering the nickel content of garnierite ores which contain iron, which comprises subjecting the ore to a reducing roast under conditions which reduce substantially all of the nickel oxide component of the nickel silicate in the ore, leaching with an aqueous solution of sulfur dioxide containing an amount of sulfur dioxide at least theoretically sufficient to unite with all of the nickel present in the ore, precipitating nickel sulfide from the leach liquor by the addition of an amount of sodium sulfide sufficient to react chemically with substantially all of the nickel in the leach liquor without precipitating a major portion of the iron content of the leach liquor.

2. A method of recovering the nickel content of garnierite ores which contain iron, which comprises subjecting the ore to a reducing roast under conditions which reduce substantially all of the nickel oxide component of the nickel silicate in the ore, leaching with an aqueous solution of sulfur dioxide containing an amount of sulfur dioxide at least theoretically sufficient to unite with all of the nickel present in the ore, removing any excess SO$_2$ from the leach liquor, precipitating nickel sulfide from the leach liquor by the addition of an amount of sodium sulfide sufficient to react chemically with substantially all of the nickel in the leach liquor without precipitating a major portion of the iron content of the leach liquor.

3. A method of recovering the nickel content from garnierite ores which contain both copper and iron which comprises subjecting the ore to a reducing roast under conditions which will reduce the major portion of the nickel oxide component of the nickel silicate, leaching with an aqueous sulfur dioxide solution containing at least sufficient sulfur dioxide to react chemically with the nickel content of the leach liquor compound, removing excess sulfur dioxide from the leach liquor whereby a precipitate is formed containing the major portion of the copper content of the ore and a very minor portion of the nickel, recovering the precipitate and subjecting the residual solution to the action of sufficient sodium sulfide theoretically to react with substantially all of the remaining nickel content of the solution whereby substantially all of the remaining nickel is precipitated without precipitation of major portions of the iron content of the leach liquor.

4. A method according to claim 1 in which the temperature of the roast is approximately 900° C.

5. A method according to claim 2 in which the temperature of the roast is approximately 900° C.

6. A method according to claim 3 in which the temperature of the roast is approximately 900° C.

NORMAN HEDLEY.
JOHN JOSEPH KRESS.